Patented July 25, 1950

2,516,309

UNITED STATES PATENT OFFICE 2,516,309

UNSATURATED ALKYD CASTING RESINS

George L. Fraser, Springfield, Mass., assignor to Monsanto Chemical Company, St. Louis, Mo., a corporation of Delaware No Drawing. Application September 11, 1947, Serial No. 773,515

6 Claims. (Cl. 260—45.4)

This invention relates to casting resins. More particularly, the invention relates to modified unsaturated polyester casting resins.

Unsaturated polyester resins derived from polyhydric alcohols and unsaturated polybasic acids have been used as casting resins, but the castings derived therefrom have generally been dark colored and brittle. Moreover, in order to harden the unsaturated polyester resins, it has been necessary to heat them at elevated temperatures for extended periods of time. The hardening process is difficult to control due to the exothermic nature of the reaction which is likely to result in a runaway reaction, producing inferior products.

It is an object of this invention to provide new casting resins.

A further object is to provide modified unsaturated polyester castings resins.

Another object is to provide a process for preparing light colored, tough, hard and resilient castings from unsaturated polyester resins.

Still another object is to provide a process for hardening unsaturated polyester resins at relatively low temperatures.

A further object is to provide a new catalyst for the hardening of unsaturated polyester resins.

These and other objects are attained by hardening an unsaturated polyester resin in the presence of extremely small quantities of a cobalt or manganese dryer and in the presence of 1-hydroxy-cyclohexyl hydroperoxide-1.

The following examples are given in illustration and are not intended as limitations on the scope of this invention. Where parts are mentioned, they are parts by weight.

Example I

An unsaturated polyester base resin was made by heating the following charge at 190–200° C., until the acid number of the resin produced was about 50–55.

|  | Mols |
|---|---|
| Maleic anhydride | 3.8 |
| Phthalic anhydride | 3.6 |
| Ethylene glycol | 2.4 |
| Diethylene glycol | 4.6 |
| 2-ethyl hexanol | 0.3 |

At the end of the condensation reaction, the reaction mixture was cooled. The product was a viscous liquid unsaturated polyester resin.

100 parts of the polyester base resin were mixed with 30 parts of styrene and 0.020 part of tertiary butyl catechol. 0.0008 part of cobalt naphthenate and 0.0008 part of manganese naphthenate were dissolved in mineral spirits and the solution was then mixed with the base resin and styrene.

To 100 parts of the final mixture there was added 1 part of 1-hydroxy-cyclohexyl hydroperoxide-1 and the entire mixture was thoroughly stirred to obtain even distribution of all ingredients throughout the mass. The mixture was then cast into a cylindrical glass container and allowed to stand at room temperature, ca. 20–25° C., for three hours, by which time the mixture was completely hardened and could be easily removed from the container. The cast cylinder was light amber in color, hard, tough and so resilient that it could be bounced off a concrete floor to a height of about 6 feet, using little more than its own weight as the activating force and without injury to the casting.

Example II

Two portions of the final resin composition made according to Example I were poured before hardening into glass cylinders 4 feet long and 1 inch in diameter. In less than two hours the composition had completely hardened at room temperature. The hardened rods were easily removed from the glass cylinders. The resulting rods were clear, transparent and slightly amber in color and contained no visible defects, i. e., no bubbles, voids, or surface imperfections. The rods were hard, tough and resilient.

Example III 500 parts of an unsaturated polyester base resin made as shown in Example I were mixed with 100 parts of styrene, 0.12 part of t-butyl catechol, 0.0036 part of cobalt naphthenate, 0.0036 part of manganese naphthenate and 5 parts of 1-hydroxy-cyclohexyl hydroperoxide-1. The mixture hardened in two hours at room temperature to yield a clear, transparent, slightly red casting which was tough, hard and resilient.

A mixture made as shown in Example III except that benzoyl peroxide was used to replace the 1-hydroxy-cyclohexyl hydroperoxide-1 could not be polymerized at room temperature and polymerized so fast at elevated temperatures that the resultant castings were brittle, dark-colored and fissured.

A mixture made as shown in Example III except that the ratio of maleic anhydride to phthalic anhydride was 5–1, gelled in 3 hours at room temperature and then became overheated due to the exothermic nature of the curing reaction with the result that the casting was cracked and fissured.

The unsaturated polyester resins of this invention are made by condensing about 50 equivalents of a dihydric alcohol with about 50 equivalents of a mixture of saturated and unsaturated dibasic acids in which the unsaturated polybasic acid constitutes about 20–30 of the acid equivalents. By "equivalents" is meant the ratio of the molecular weight to the functionality of the compounds.

The dihydric alcohols to be used are the mono- and polyglycols such as ethylene glycol, diethylene glycol, triethylene glycol and higher polyethylene glycols, propylene glycol, polypropylene glycols, butylene glycol, polybutylene gycols, polymethylene glycols, etc. They may be partially replaced by saturated or unsaturated monohydric alcohols to the extent of about 7 equivalents. Among the monohydric alcohols which may be used are methanol, ethanol, propanol, butanol, isopropanol, isobutanol, pentanol, octyl alcohol, allyl alcohol, crotyl alcohol, etc. Up to 5 equivalents of the alcohol constituent may be a trihydric or polyhydric alcohol such as glycerol, pentaerythritol, mannitol, sorbitol, etc.

The dibasic acid ingredients are a mixture of saturated and unsaturated acids in which the unsaturated acid constitutes from 20 to 30 equivalents. Maleic acid or anhydride is the preferred unsaturated acid, but it may be replaced in whole or in part by other unsaturated dibasic acids such as itaconic, citraconic, mesaconic, fumaric, methylene malonic, etc., acids, or their anhydrides. The saturated dibasic acid is preferably phthalic acid or anhydride, but it may be replaced in whole or in part by other saturated dibasic acids such as mono-, di-, tri-, or tetrachlorophthalic, isophthalic, terephthalic, diphenic, malonic, succinic, glutaric, methyl malonic, methyl succinic, methyl glutaric, chloromalonic, acetyl malonic, adipic, etc., acids or anhydrides.

Part of the dibasic acid equivalents may be replaced by monobasic saturated or unsaturated acids to the extent of 7 equivalents. Among the monobasic acids which may be used are acetic, propionic, benzoic, butyric, formic, acrylic, methacrylic, crotonic, etc., acids, coconut oil acids, linseed oil acids, soya bean oil acids. Furthermore, tribasic or other polybasic acids such as aconitic, citric or tricarballylic acids may be used to replace up to 5 of the acid equivalents.

The alcohol and acid components of the polyester are reacted together at elevated temperatures ranging from 150–250° C. until an acid number of 40–65 is obtained. The reaction product is then cooled to room temperature and serves as the base resin of this invention.

In order to obtain the casting resins of this invention, the base polyester resin must be mixed with a polymerizable monomer, a polymerization inhibitor, an oil-soluble cobalt or manganese organic salt, or a mixture thereof, and 1-hydroxy cyclohexyl hydroperoxide-1 in certain critical amounts.

The polymerizable monomer may be any unsaturated polymerizable compound taken from the class consisting of mono- and poly-vinylidene, and mono- and poly-allyl monomers. The monomer used will have substantial effect on the speed and temperature at which the final composition will cure. Among the properties of the unsaturated monomers which have a strong influence on the final composition are: (1) the polymerization rate which modifies the curing rate of the final composition, (2) the solubility of the monomer in the polyester which limits the quantity which may be used, and (3) the volatility of the monomer.

In a preferred embodiment of this invention the unsaturated monomer is an aryl mono-olefin, especially styrene. Among the other aryl olefins which may be used are ring-substituted styrenes such as mono- and poly-chlorostyrenes, mono- and poly-alkylstyrenes and mono- and poly-alkoxystyrenes in which the chlorine, alkyl or alkoxy groups are substituted on the benzene ring, vinyl naphthalene, vinyl diphenyl, etc.

In another embodiment of this invention the unsaturated monomer is a diallyl ester of a saturated dibasic acid including the substituted allyl esters such as diethallyl, dichlorallyl, dimethallyl esters. Diallyl phthalate has been found to be especially useful, but other esters which may be used are diallyl adipate, sebacate, succinate, malonate, glutarate and the corresponding diethallyl, dimethallyl and dichlorallyl esters.

Other unsaturated vinylidene monomers which may be used are vinyl esters, ethers and ketones, vinylidene halides, acrylic and α-substituted acrylic acids and their derivatives such as their amides, esters and nitriles.

The amount of unsaturated monomer to be used may be varied between 25 and 100 parts per 100 parts of polyester base resin. The amount used for optimum conditions will depend somewhat on the polymerization rate, solubility and volatility of the monomer as outlined above.

A polymerization inhibitor such as the tertiary butyl catechol shown in the examples must be used in quantities ranging from 0.005–0.1 part per 100 parts of unsaturated polyester base resin in order to help control the exothermic curing reaction. It is advantageous to add the inhibitor to the base resin since it allows large quantities of the base resin to be prepared and stored pending the admixture of the other ingredients necessary for producing the resins of this invention. Other polymerization inhibitors such as p-quinone may be used. Care must be taken to use the amounts within the critical specified range since larger quantities will make it impossible to cure the resins at room temperatures and smaller quantities allow the reaction to go too fast, yielding inferior products having high color, cracks, fissures, bubbles, voids, etc.

The cobalt and manganese naphthenates shown in the examples may be replaced in whole or in part by other oil-soluble cobalt and manganese organic salts such as their oleates, linoleates, etc. The amount of cobalt or manganese salt or mixture of salts must be restricted to from 0.0002 to 0.0020 part per 100 parts of unsaturated polyester base resin. The cobalt and manganese salts serve to preserve a balance between the polymerization inhibitor and polymerization catalyst and are instrumental in controlling the cure rate.

The catalyst to be used to cure the unsaturated polyester resins modified as above is 1-hydroxy cyclohexyl hydroperoxide-1. This compound has the formula:

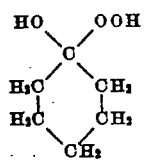

It has the peculiar and unexpected property of catalyzing the cure of the modified unsaturated polyester resins at relatively low temperatures to such an extent that complete cure is obtained in from 2 to 5 hours and at the same time it appears to inhibit the formation of excess heat which has been so detrimental to previous unsaturated polyester casting resins. As shown above, it only has this combined property in relation to unsaturated polyesters containing from 20 to 30 equivalents of maleic acid since resins made with larger amounts of maleic acid overheat. It may be used in amounts ranging from about 0.25 to about 5 parts per 100 parts of unsaturated polyester base resin. Larger amounts result in too rapid a curing action and smaller amounts are insufficient to cure the compounded resin within a practical time.

The customary peroxide catalysts cannot be used in the process and products of this invention. For example, benzoyl peroxide does not not catalyze the reaction at room temperatures and at the elevated temperature at which it becomes active, the curing is so rapid and exothermic that the products are substantially useless.

Thus, this invention is concerned with a polyester resin derived from about 50 equivalents of a dihydric alcohol, 20 to 30 equivalents of an unsaturated dibasic acid, 30 to 20 equivalents of a saturated dibasic acid, 100 parts of said polyester resin then being mixed with from 25 to 100 parts of an unsaturated polymerizable monomer, 0.005–0.10 part of a polymerization inhibitor, 0.0002 to 0.0020 part of an oil-soluble cobalt or manganese organic salt or mixtures thereof and from 0.25 to 5 parts of 1-hydroxy cyclohexyl peroxide-1. The mixture is then cured at 15–40° C., for from 2–5 hours to provide cast objects which are clear, transparent, slightly colored, hard, tough and resilient. The polyester resins may be modified by small amounts of mono- and polyhydric alcohols as well as mono- and polybasic acids.

If desired, various conventional additives may be mixed with the modified unsaturated polyester resin prior to the curing step. Such additives are lubricants, dyes, fillers, pigments, etc.

The products of this invention are particularly valuable due to their toughness, hardness and resiliency. They may be machined and postformed into simple shapes at elevated temperatures such as 100° C. They may be used for billiard balls, ornamental novelties, cane, umbrella and cutlery handles, etc. Their original pale color makes it possible to provide cast articles in a myriad of colors of varying shade, hue and opacity.

The process of the invention is particularly advantageous in that low temperatures and short times are required to harden the resins and especially since it eliminates the need for careful control to prevent overheating during the curing cycle. The low curing temperature makes it possible to mount animal, mineral and vegetable specimens therein without injury to the specimens and without the use of heating apparatus which would be cumbersome and expensive for scientific exploration teams.

The resins are further extremely valuable for use in cementing bristles into brush handles since the curing process does not injure the bristles.

It is obvious that many variations may be made in the products and processes of this invention without departing from the spirit and scope thereof as defined in the appended claims.

What is claimed is:

1. A process which comprises mixing 100 parts of a polyester resin which has been prepared by condensing 50 equivalents of a dihydric alcohol with 20–30 equivalents of an alpha, beta ethylenically unsaturated, dicarboxylic acid and 30–20 equivalents of a dibasic acid taken from the group consisting of phthalic, monochlorophthalic, dichlorophthalic, trichlorophthalic, tetrachlorophthalic, isophthalic, terephthalic, diphenic, malonic, succinic, glutaric, methyl malonic, methyl succinic, methyl glutaric, chloromalonic, acetyl malonic, and adipic acids and the anhydrides thereof, with from 25–100 parts of a vinylidene monomer polymerizable therewith, 0.0002–0.002 part of a compound taken from the group consisting of cobalt and manganese salts of naphthenic, oleic and linoleic acids, 0.005–0.10 part of a polymerization inhibitor taken from the group consisting of p-tertiary butyl catechol and p-quinone, and from 0.25–5 parts of 1-hydroxy cyclohexyl hydroperoxide-1, and thereafter curing the mixture at from 15 to 40° C.

2. A process as in claim 1 wherein the ethylenically unsaturated dicarboxylic acid is maleic acid.

3. A process as in claim 2 wherein the dibasic acid is phthalic acid.

4. A process as in claim 3 wherein the vinylidene monomer is an aryl mono-olefin.

5. A process as in claim 4 wherein the aryl-mono-olefin is styrene.

6. A process as in claim 1 wherein the vinylidene monomer is diallyl phthalate.

GEORGE L. FRASER.

REFERENCES CITED

The following references are of record in the file of this patent:

UNITED STATES PATENTS

| Number | Name | Date |
|---|---|---|
| 2,298,405 | Milas | Oct. 13, 1942 |
| 2,409,633 | Kropa | Oct. 22, 1946 |
| 2,428,788 | D'Alelio | Oct. 14, 1947 |

OTHER REFERENCES

Chemical Industries, vol. 55, p. 265, Aug. 1944.
Perry et al., pp. 134–136 and 222, Modern Plastics, Nov. 1947.